United States Patent
Hsieh et al.

(10) Patent No.: US 12,490,013 B2
(45) Date of Patent: Dec. 2, 2025

(54) SUPPORTING UNIT

(71) Applicant: Merry Electronics(Shenzhen) Co., Ltd., ShenZhen (CN)

(72) Inventors: Wan Hsiu Hsieh, Taichung (TW); Ching Hsuan Wan, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 238 days.

(21) Appl. No.: 18/447,309

(22) Filed: Aug. 10, 2023

(65) Prior Publication Data
US 2025/0024185 A1    Jan. 16, 2025

(30) Foreign Application Priority Data

Jul. 12, 2023    (TW) ................... 112126023

(51) Int. Cl.
*H04R 1/10*    (2006.01)
*A42B 1/0188*    (2021.01)
(Continued)

(52) U.S. Cl.
CPC ........... *H04R 1/105* (2013.01); *A42B 1/0188* (2021.01); *F16C 11/103* (2013.01); *H04R 5/0335* (2013.01); *H04R 1/1066* (2013.01)

(58) Field of Classification Search
CPC ..... A42B 1/0188; F16C 11/103; H04R 1/105; H04R 1/1066; H04R 5/0335; Y10T 403/32065; Y10T 403/32213; Y10T 403/32319; Y10T 403/32327; Y10T 403/32377; Y10T 403/32401; Y10T 403/32557; Y10T 403/32581; Y10T 403/32819; Y10T 403/32827; Y10T 403/32836; Y10T 403/4614;
(Continued)

(56) References Cited

U.S. PATENT DOCUMENTS 3,579,640 A * 5/1971 Beguin ................... A61F 11/14
                                              2/209
3,833,939 A * 9/1974 Dostourian .......... H04R 1/1066
                                              2/209

(Continued)

FOREIGN PATENT DOCUMENTS

| DE | 959376 C * | 3/1957 | ........... H04R 5/0335 |
| DE | 3032956 A1 * | 4/1982 | ........... H04R 5/0335 |
| FR | 555101 A * | 6/1923 | ........... H04R 1/1066 |

*Primary Examiner* — Josh Skroupa
(74) *Attorney, Agent, or Firm* — JCIPRNET

(57) ABSTRACT

A supporting unit includes a first part, a second part, and an adjusting module. The first part includes a first connecting member and a supporting member. The supporting member is detachably connected to the first connecting member. The first connecting member is rotatably connected to the second part. The adjusting module is disposed in the first part and the second part. The adjusting module includes a rod body, a friction component, and an adjusting member. The rod body is connected to the second part. The friction component is movably connected to the rod body and is located between the first connecting member and the adjusting member. The first part generates a frictional force with the second part through the adjusting module. The adjusting member is movably connected to the rod body to adjust the frictional force.

5 Claims, 4 Drawing Sheets

(51) Int. Cl.
*F16C 11/10* (2006.01)
*H04R 5/033* (2006.01)

(58) Field of Classification Search
CPC ......... Y10T 403/4617; Y10T 403/7182; Y10T 403/7188
USPC ......... 403/60, 78, 91, 92, 98, 101, 113, 116, 403/117, 145, 146, 147, 235, 236, 398, 403/399
See application file for complete search history.

(56) References Cited

U.S. PATENT DOCUMENTS

| | | | | |
|---|---|---|---|---|
| 4,027,113 | A * | 5/1977 | Matsumoto | F16C 11/0661 381/370 |
| 4,106,170 | A * | 8/1978 | Schoeneweis | F16K 1/48 403/146 |
| 5,293,647 | A * | 3/1994 | Mirmilshteyn | H04R 1/1066 379/430 |
| 5,529,421 | A * | 6/1996 | Epkens | H02G 1/081 403/78 |
| 5,542,774 | A * | 8/1996 | Hoy | A61F 5/0125 403/116 |
| 6,554,524 | B1 * | 4/2003 | Smith | F16B 21/165 403/78 |
| 7,674,063 | B2 * | 3/2010 | Jan | F16C 11/106 403/145 |
| 10,688,367 | B2 * | 6/2020 | Tolman | F16C 11/103 |
| 10,735,847 | B2 * | 8/2020 | Hsiao | H04R 1/105 |

\* cited by examiner

SUPPORTING UNIT

CROSS-REFERENCE TO RELATED APPLICATION

This application claims the priority benefit of Taiwan application serial no. 112126023, filed on Jul. 12, 2023. The entirety of the above-mentioned patent application is hereby incorporated by reference herein and made a part of this specification.

BACKGROUND

Technical Field

The disclosure relates to a unit, and in particular, to a supporting unit.

Description of Related Art

Today's earmuff headphones are used to support the supporting member of the earmuffs, and the frictional force is adjusted through the rubber sealing ring (O-ring). However, since the rubber sealing ring is susceptible to deterioration after use, the sealing ring may not provide a stable frictional force, which affects the service life and the rotational feel of the supporting member.

SUMMARY

The disclosure provides a supporting unit which may provide a stable frictional force.

A supporting unit of the disclosure includes a first part, a second part, and an adjusting module. The first part includes a first connecting member and a supporting member. The supporting member is detachably connected to the first connecting member. The first connecting member of the second part is rotatably connected to the second part. The adjusting module is disposed in the first part and the second part. The adjusting module includes a rod body, a friction component, and an adjusting member. The rod body is connected to the second part. The friction component is movably connected to the rod body and is located between the first connecting member and the adjusting member. The first part generates a frictional force with the second part through the adjusting module. The adjusting member is movably connected to the rod body to adjust the frictional force.

Based on the above, the first part of the supporting unit of the disclosure generates a frictional force with the second part through the adjusting module. The adjusting component may provide a stable frictional force, so that when there is no external force applied, the first part is not susceptible to rotation so as to improve the stability and the degree of rotational positioning of the supporting unit.

DESCRIPTION OF THE EMBODIMENTS

Figure 1:
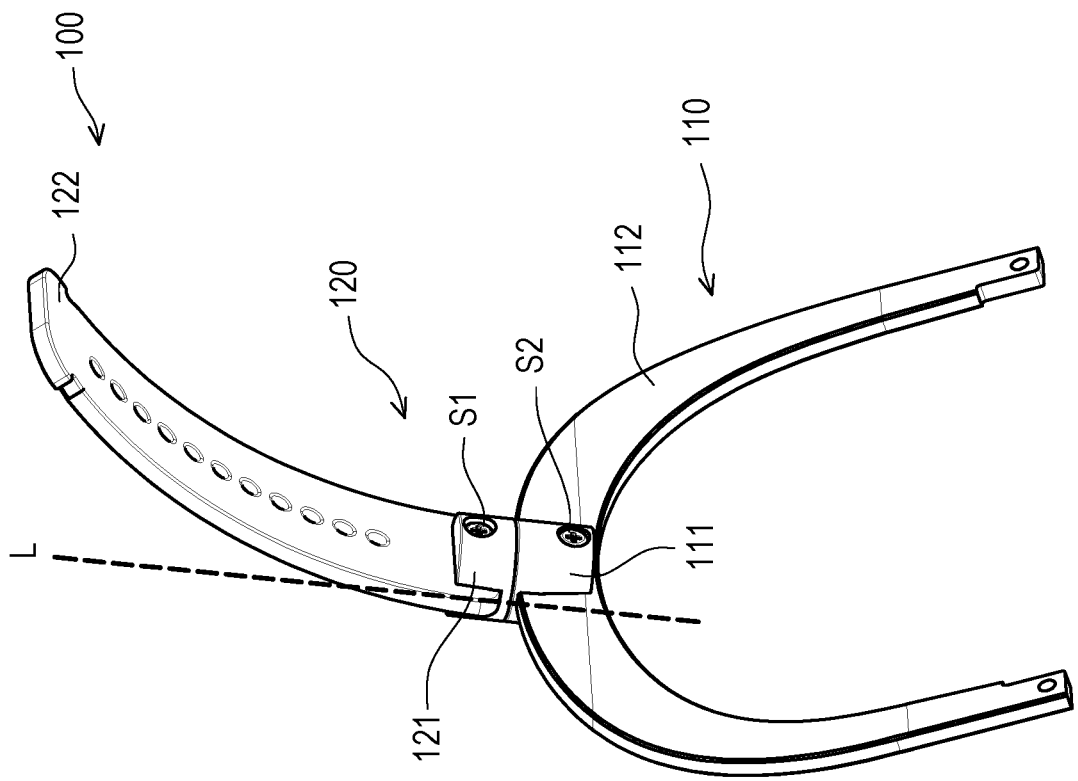
FIG. 1 is a schematic view of a supporting unit according to an embodiment of the disclosure.
Figure 2:
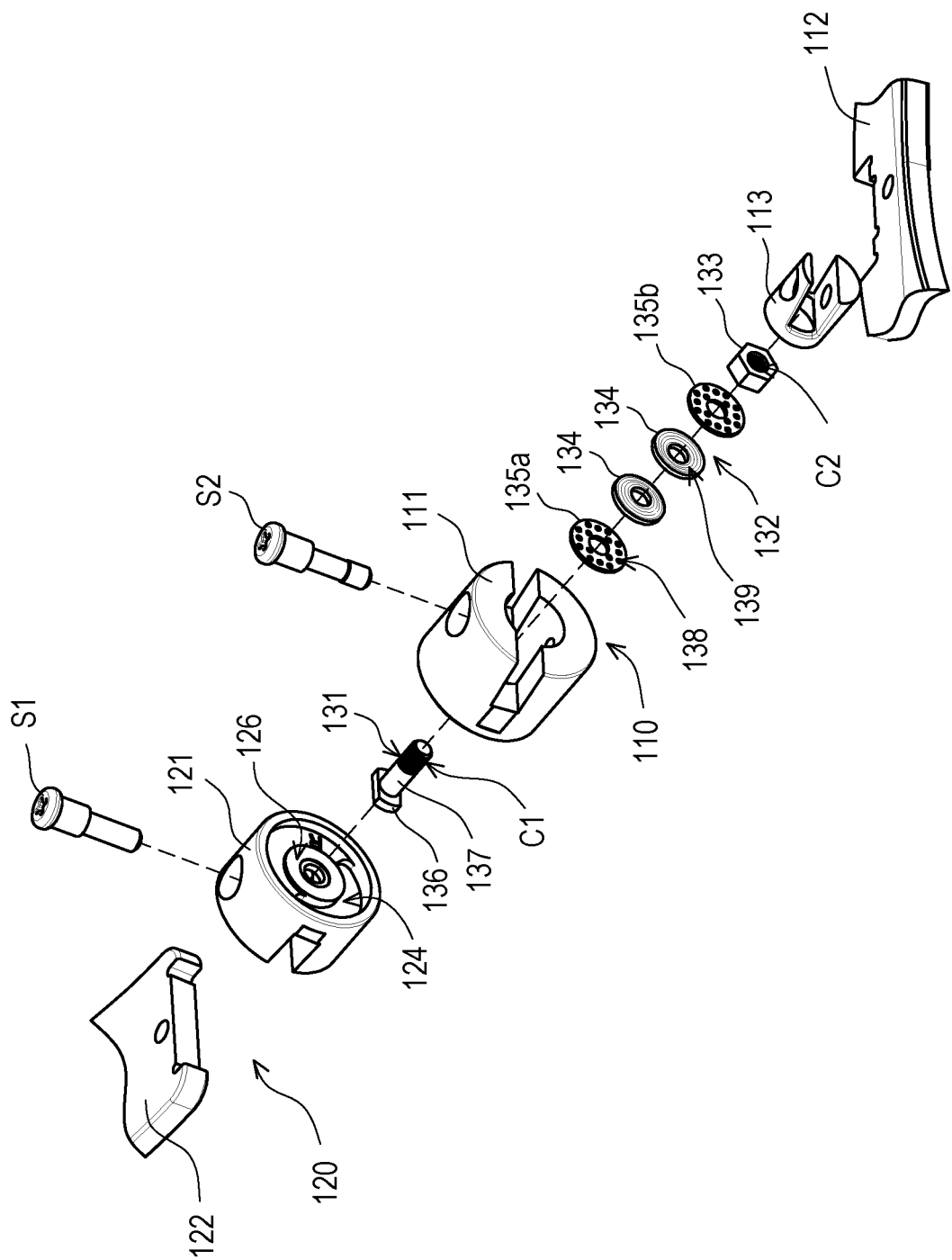
FIG. 2 is an exploded view of the supporting unit of FIG. 1.
Figure 3:
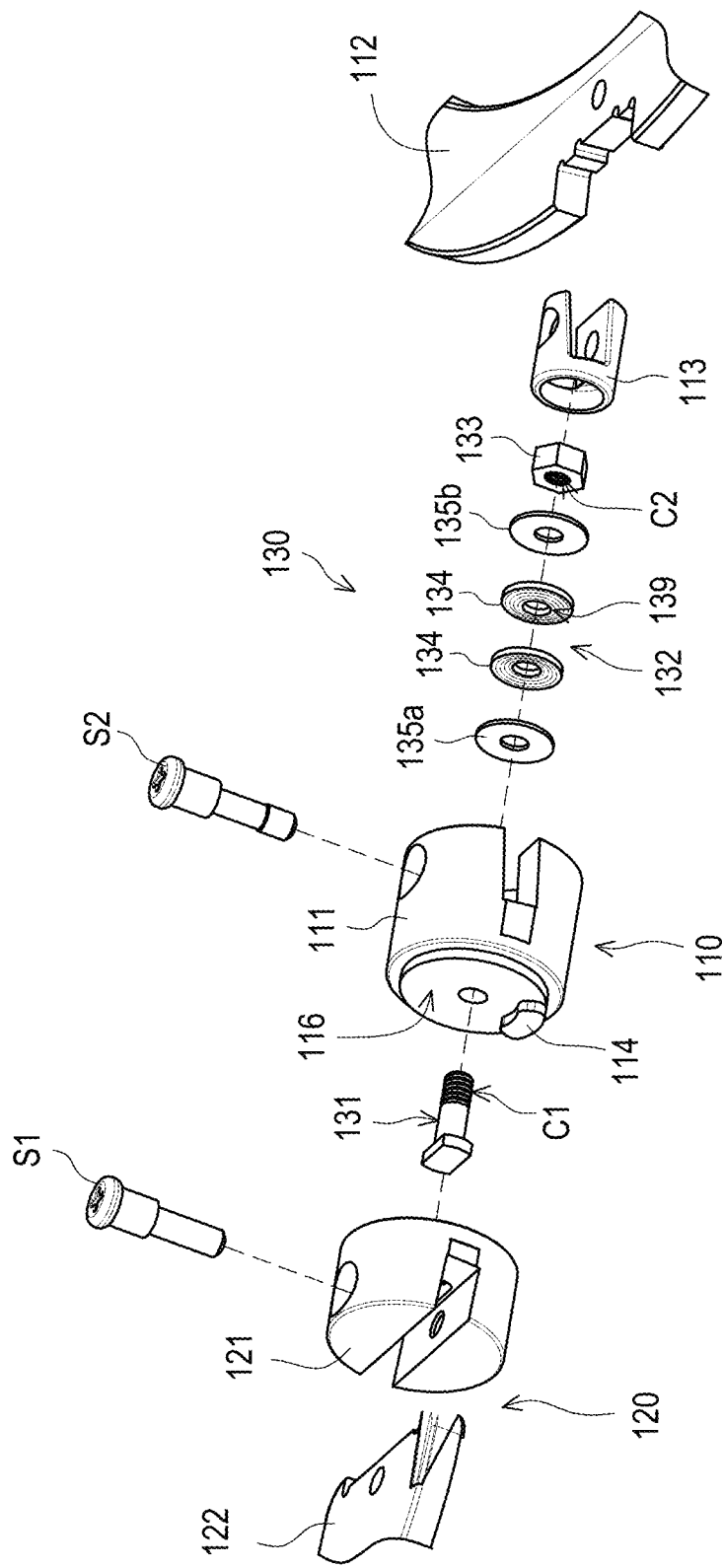
FIG. 3 is an exploded view of the supporting unit of FIG. 2 from another perspective.
Figure 4:
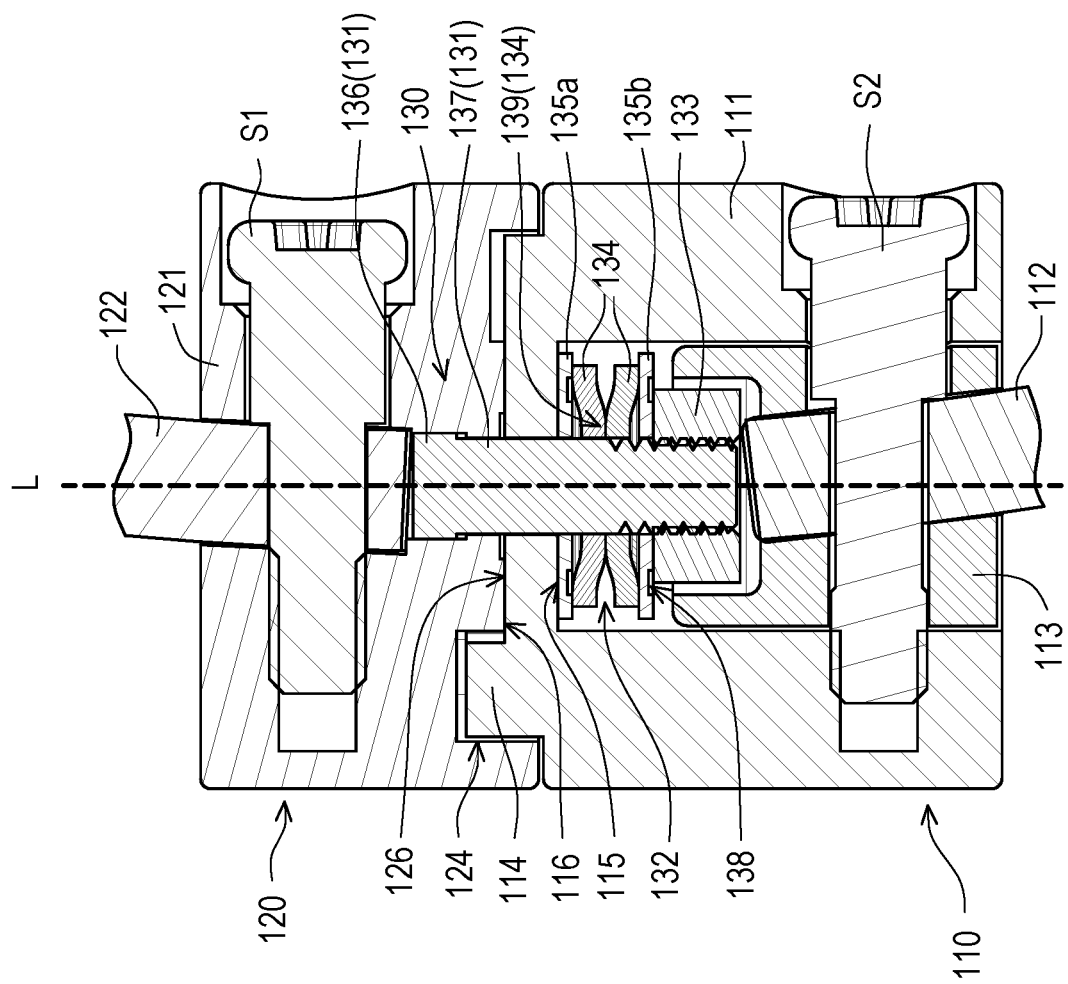
FIG. 4 is a cross-sectional view of the supporting unit of FIG. 1.

FIG. 1 is a schematic view of a supporting unit according to an embodiment of the disclosure. FIG. 2 is an exploded view of the supporting unit of FIG. 1. FIG. 3 is an exploded view of the supporting unit of FIG. 2 from another perspective. FIG. 4 is a cross-sectional view of the supporting unit of FIG. 1. Please refer to FIG. 1 to FIG. 4 at the same time. A supporting unit 100 includes a first part 110, a second part 120, and an adjusting module 130. The first part 110 includes a first connecting member 111 and a supporting member 112. The supporting member 112 is detachably connected to the first connecting member 111. The second part 120 includes a second connecting member 121 and a headband 122. The headband 122 is connected to the second connecting member 121 through a fastening member S1. The first connecting member 111 is rotatably connected to the second connecting member 121 of the second part 120.

The adjusting module 130 is disposed in the first part 110 and the second part 120 without being exposed (FIG. 1). The adjusting module 130 has a damping effect. The first part 110 generates a frictional force with the second part 120 through the adjusting module 130. When there is no external force applied, the first part 110 will not rotate or slide relative to the second part 120. The first part 110 is fixed at a required position through a frictional force.

The magnitude of the frictional force generated by the adjusting module 130 affects the magnitude of the value of the rotational force of the supporting unit 100. The frictional force and the value of the rotational force are related to the external force required to be applied when the user rotates the first part 110 (the first connecting member 111) relative to the second part 120. The greater the frictional force, the greater the value of the rotational force, and thus it requires a greater external force to be applied. The frictional force, the value of the rotational force, and the external force are positively correlated. The greater the frictional force (the greater the value of the rotational force), the less likely the first part 110 will rotate and shake when there is no external force applied, which may improve the stability and the degree of rotational positioning of the supporting unit 100.

The supporting member 112 is, for example, a harpoon structure. The supporting unit 100 may be used for an earmuff earphone. The two supporting units 100 may be disposed on both sides of the earmuffs. The supporting member 112 may be connected to the earmuffs. The first part 110 may rotate relative to the second part 120 so as to adjust and position the earmuff (supporting member 112) in a proper position.

As shown in FIG. 2 and FIG. 3, the second connecting member 121 includes a sliding groove 124. The first connecting member 111 includes a protruding part 114. The protruding part 114 is slidably connected to the sliding groove 124. The sliding groove 124 surrounds an axis L (FIG. 4), so that the first connecting member 111 is rotatably connected to the second connecting member 121 along the axis L. The first part 110 may rotate about the axis L relative to the second part 120. As shown in FIG. 4, there is an included angle between the supporting member 112 and the headband 122 and the axis L without extending along the axis L.

As shown in FIG. 2 to FIG. 4, the adjusting module 130 includes a rod body 131, a friction component 132 and an adjusting member 133. The rod body 131 is connected to the second connecting member 121 of the second part 120. The friction component 132 is movably connected to the rod body 131 along the axis L and is located between the first connecting member 111 and the adjusting member 133. The adjusting member 133 is movably connected to the rod body 131 along the axis L to adjust the frictional force.

The rod body 131 is, for example, a screw. The adjusting member 133 is, for example, a nut. The rod body 131 is connected to the first connecting member 111 and the second connecting member 121 along the axis L (FIG. 4). Specifically, a head 136 of the rod body 131 is fixed to the second connecting member 121, a connecting part 137 of the rod body 131 is connected to the head 136 and extends along the axis L, and part of the connecting part 137 is located on the first connecting member 111. The end of the connecting part 137 has an external thread C1. The adjusting member 133 has an internal thread C2. The external thread C1 engages with the internal thread C2.

The friction component 132 is passed through the rod body 131 and includes two metal disc-shaped elastic pieces 134 and two washers 135a and 135b. The two metal disc-shaped elastic pieces 134 are located between the two washers 135a and 135b. The metal disc-shaped elastic piece 134 has a bent part 139. As shown in FIG. 4, the two bent parts 139 press against each other, the washer 135a presses against the first connecting member 111, and the washer 135b presses against the adjusting member 133.

As shown in FIG. 4, when the adjusting member 133 moves up and down along the axis L relative to the rod body 131, the washer 135b is pushed by the adjusting member 133 to move relative to the first connecting member 111. The washer 135b pushes against the corresponding metal disc-shaped elastic piece 134, so that the two metal disc-shaped elastic pieces 134 press against each other and deform, thereby generating a frictional force between a top surface 116 of the first connecting member 111 and a bottom surface 126 of the second connecting member 121, and generating a frictional force between the washer 135a and an inner wall 115 of the first connecting member 111.

In addition, the first part 110 further includes a filling member 113. The filling member 113 is detachably connected to the supporting member 112 and the first connecting member 111. The filling member 113 and the supporting member 112 are connected to the first connecting member 111 through another fastening member S2. The supporting member 112 and the adjusting member 133 are partially located on the filling member 113. Lubricating oil may be included in the supporting unit 100. The washers 135a and 135b include multiple oil storage tanks 138 (FIG. 2). The oil storage tanks 138 may be used to store excess lubricating oil.

The material of the first part 110 and the second part 120 is, for example, metal, so that the supporting unit 100 has a metal appearance so as to improve the appearance of the supporting unit 100 and enhance the structural strength of the supporting unit 100. According to the actual test results, the force values of the structural strength test of the supporting unit 100 of the embodiment are all greater than 20 kilograms (kgf). The structural strength test includes a tensile test of the first part 110 and the second part 120, a rotation test of the supporting member 112 rotating around the axis L, and a rotation test of the supporting member 112 rotating around the first connecting member 111.

The material of the adjusting module 130 is, for example, metal, which has better structural strength so as to improve the durability of the supporting unit 100 and improve the rotational feel of the first part 110. The material of the two metal disc-shaped elastic pieces 134 may be tool steel, so that the two metal disc-shaped elastic pieces 134 have a large amount of deformation so as to increase the adjustable range of the frictional force and then increase the adjustable range of the value of the rotational force of the supporting unit 100. The adjustable range of the value of the rotational force of the supporting unit 100 in the embodiment is, for example, between 0 kgf-cm and 500 kgf-cm.

The user may adjust the position of the adjusting member 133 relative to the rod body 131 (friction component 132) according to his needs so as to adjust the magnitude of the frictional force and then adjust the value of the rotational force of the supporting unit 100. When adjusting the frictional force, the user may remove the fastening member S2 to separate the supporting member 112 and the filling member 113 from the first connecting member 111, so that the adjusting member 133 is exposed. The user may adjust the position of the adjusting member 133 relative to the rod body 131 to adjust the frictional force between the top surface 116 of the first part 110 and the bottom surface 126 of the second part 120 and the frictional force between the washer 135a and the inner wall 115, and then adjust the value of the rotational force of the supporting unit 100.

In summary, the first part of the supporting unit of the disclosure generates a frictional force with the second part through the adjusting module. The adjusting component may provide a stable frictional force, so that the first part is not susceptible to rotation when there is no external force applied so as to improve the stability and the degree of rotational positioning of the supporting unit.

What is claimed is:

1. A supporting unit, comprising:
    a first part, comprising a first connecting member and a supporting member, wherein the supporting member is detachably connected to the first connecting member;
    a second part, wherein the first connecting member is rotatably connected to the second part; and
    an adjusting module, disposed in the first part and the second part, wherein the adjusting module comprises a rod body, a friction component, and an adjusting member, the rod body is connected to the second part along an axis, the friction component is movably connected to the rod body and is located between the first connecting member and the adjusting member, the first part generates a frictional force with the second part through the adjusting module, and the adjusting member is movably connected to the rod body to adjust the frictional force,
    wherein the second part comprises a second connecting member and a headband, the headband is connected to the second connecting member, the first connecting member is rotatably connected to the second connecting member, and the first connecting member generates the frictional force with the second connecting member,
    wherein the second connecting member comprises a sliding groove, the first connecting member comprises a protruding part, and the protruding part is slidably connected to the sliding groove,
    the sliding groove surrounds the axis, the protruding part is connected to the sliding groove and configured to rotate relative to the second connecting member with the axis as a rotation axis.

2. The supporting unit according to claim 1, wherein the friction component is passed through the rod body, the friction component comprises two metal disc-shaped elastic pieces and two washers, the two metal disc-shaped elastic pieces are located between the two washers, one of the two washers presses against the first connecting member and generates the frictional force with the first connecting member, and the other of the two washers presses against the adjusting member.

3. The supporting unit according to claim 2, wherein the friction component is movably passed through the rod body along the axis, the adjusting member is movably connected to the rod body along the axis, and the first part is suitable for rotating around the axis relative to the second part.

4. The supporting unit according to claim 1, wherein the first connecting member and the second connecting member are connected along the axis, and the rod body is connected to the first connecting member and the second connecting member along the axis.

5. The supporting unit according to claim 1, wherein the first part comprises a filling member, the filling member is detachably connected to the supporting member and the first connecting member, and the supporting member and the adjusting member are partially located on the filling member.

\* \* \* \* \*